No. 827,715. PATENTED AUG. 7, 1906.
J. & F. DOEPKER.
CLUTCH MECHANISM.
APPLICATION FILED FEB. 27, 1906.
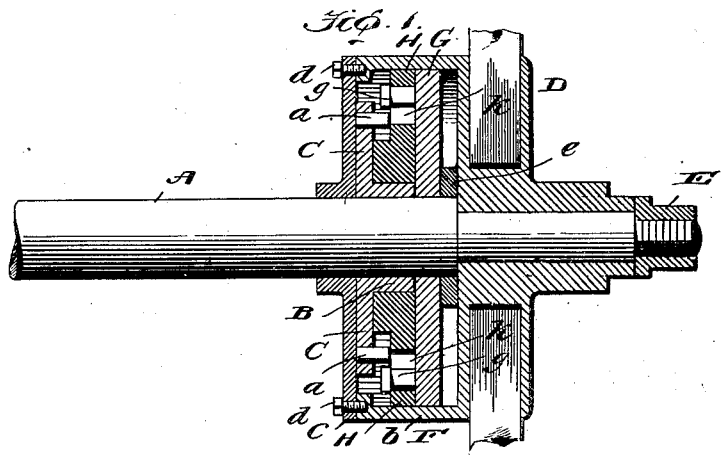
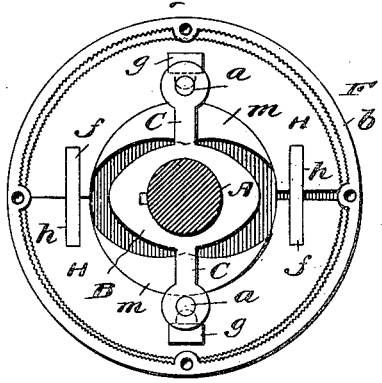
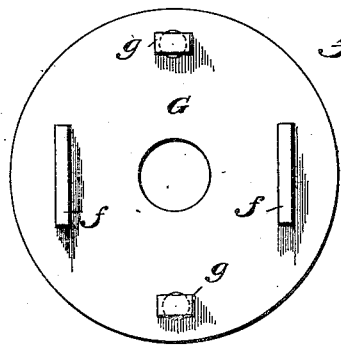
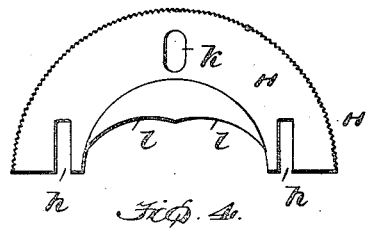
Witnesses
Inventors
J. and F. Doepker

UNITED STATES PATENT OFFICE.

JOSEPH DOEPKER AND FRANK DOEPKER, OF OTTAWA, OHIO.

CLUTCH MECHANISM.

No. 827,715.    Specification of Letters Patent.    Patented Aug. 7, 1906.

Application filed February 27, 1906. Serial No. 303,164.

*To all whom it may concern:*

Be it known that we, JOSEPH DOEPKER and FRANK DOEPKER, citizens of the United States, residing at Ottawa, in the county of Putnam and State of Ohio, have invented new and useful Improvements in Clutch Mechanism, of which the following is a specification.

Our invention pertains to vehicles, and more particularly to the drive-shafts or axles and wheels of motor-vehicles; and it contemplates the provision of a simple, durable, and reliable clutch mechanism for transmitting motion from a drive-shaft or axle to a wheel and for permitting the wheel to turn freely on the shaft or axle when it "overruns" the same, this in order to enable a vehicle to turn a corner with facility and without skidding.

With the foregoing in mind the invention will be fully understood from the following description and claims when the same are read in connection with the accompanying drawings, forming part of this specification, in which—

Figure 1 is a view, partly in section and partly in elevation, of a shaft or axle and a wheel constructed and equipped in accordance with our invention. Fig. 2 is a view taken at right angles to Fig. 1 and illustrating the shaft or axle in transverse section and also illustrating the clutch mechanism, the closure-plate shown in Fig. 1 being removed. Fig. 3 is an elevation of the disk of the clutch mechanism removed, and Fig. 4 is a similar view of one of the radially-movable shoes.

Similar letters designate corresponding parts in all of the views of the drawings, referring to which—

A is the drive shaft or axle, which is peculiar in that it is provided at an intermediate point of its length with a cam B, preferably elliptical in form, and is also provided with arms C, which reach outwardly from the comparatively narrow portion of the cam and have lateral projections $a$ adjacent to their outer ends, and D is a wheel which is retained on the outer portion of the shaft or axle by a nut E, as shown, or by any other means compatible with the purpose of our invention. The said wheel D may be of the "artillery" or any other approved type without affecting our invention.

F is the casing of our novel clutch mechanism, which comprises a rim $b$, fixed with respect to and extending inwardly from the wheel D, and a closure-plate $c$, loosely surrounding the shaft or axle and detachably connected to the rim, preferably through the medium of screws $d$, as illustrated.

In addition to the casing F and the cam B and arms C our novel clutch mechanism comprises a disk G, which is loosely mounted on the axle A and spaced from the wheel by a washer $e$, and radially-movable shoes H. The disk G is provided on one side and at diametrically opposite points with guide-ribs $f$ and is also provided on the same side and preferably at points equidistant between the guide-ribs with headed pins $g$. The shoes H are provided in their inner edges with notches $h$, positioned to loosely receive the guide-ribs $f$, and are also provided with slots $k$, designed to receive the pins $g$, whereby it will be seen that the shoes are free to move outwardly and inwardly at the side of the disk G, and yet are held against lateral movement with respect to said disk. Said shoes H are further provided with inner edges $l$, preferably shaped as shown, for the engagement of the cam B, and with flanges $m$, the outer edges of which are convex and are presented to the pins $a$ on the arms C for a purpose which will be presently set forth.

In the preferred embodiment of our invention we prefer to roughen or serrate the outer edges of the shoes H and the inner surface of the rim $b$, this in order to enable the former to more positively engage or take hold of the latter. We do not desire, however, to be understood as confining ourselves to such provision, as the outer edges of the shoes H and the inner surface of the rim $b$ may be made smooth without involving departure from the scope of our invention.

In the practical use of our improvements it will be seen that when the shaft or axle A is rotated the cam B will engage the inner edges of the shoes H and by forcing said shoes outwardly against the rim $b$ will fix the wheel D with respect to the shaft or axle so that the two will turn together—i. e., the wheel will be turned by the shaft or axle. When, however, the wheel overruns the shaft or axle, as is the case when the wheel is the outer wheel during the turning of a corner, it will be apparent that the wheel will tend to turn freely on the axle and in so doing will carry the disk G around with it, when the flanges $m$, moving against the pins $a$, will effect an inward movement of the shoes H and in that way render the wheel entirely free of the axle.

It will also be apparent that when the shaft or axle overtakes the wheel, as it were, which is the case when a vehicle resumes its straight course, the cam B, acting against the shoes H, will fix the wheel with respect to the shaft or axle, so that the latter will turn the former.

It will be readily gathered from the foregoing that, while simple, compact, and inexpensive in construction, our novel clutch mechanism is reliable in operation and is well adapted to withstand the usage to which the parts of motor-vehicles are ordinarily subjected.

We have entered into a detailed description of the construction constituting the present and preferred embodiment of our invention with a view of imparting a definite understanding of the said embodiment. We do not desire, however, to be understood as confining ourselves to the said specific construction and relative arrangement of parts, as such changes or modifications may be made in practice as fairly fall within the scope of our claimed invention.

Having described our invention, what we claim, and desire to secure by Letters Patent, is—

1. In a clutch mechanism, the combination of a shaft or axle provided with a cam fixed thereon, a wheel loosely mounted on the shaft or axle and equipped with a rim, a shoe mounted between the cam and the rim and movable by the former against the latter, and means on the shaft or axle arranged to coöperate with means on the shoe to positively move the shoe in a direction away from the rim and toward the shaft or axle.

2. In a clutch mechanism, the combination of a shaft or axle having fixed thereto a cam and an arm, a wheel loosely mounted on the shaft or axle and equipped with a rim, and a shoe mounted between the cam and the rim and movable by the former against the latter and having means for the engagement of the arm on the shaft or axle whereby said arm is enabled to positively move the shoe in a direction away from the rim and toward the shaft or axle.

3. In a clutch mechanism, the combination of a shaft or axle provided with a cam and an arm reaching from the cam and having a lateral projection, a wheel loosely mounted on the shaft or axle and equipped with a rim, and a shoe mounted between the cam and the rim and movable by the former against the latter and having a flange provided with a convex edge arranged to engage the lateral projection on the arm of the cam.

4. In a clutch mechanism, the combination of a shaft or axle provided with a cam and an arm reaching from the cam and having a lateral projection, a wheel loosely mounted on the shaft or axle and equipped with a rim, a disk loosely mounted on the shaft or axle between the cam and the wheel and having a guide-rib and a headed pin, and a shoe mounted between the cam and the rim and having a flange provided with a convex edge arranged to engage the lateral projection on the arm of the cam and also having a notch receiving the guide-rib of the disk and a slot receiving the headed pin of the disk.

5. In a clutch mechanism, the combination of a shaft or axle provided with a cam and arms reaching in opposite directions outward from the cam and having lateral projections, a wheel loosely mounted on the shaft or axle, a casing fixed with respect to the wheel and inclosing the cam and the arms thereon and having a rim, a disk loosely mounted on the shaft or axle and having guide-ribs and headed pins, and radially-movable shoes arranged together with the disk in the casing and having notches and slots receiving the guide-ribs and headed pins, respectively, and also having flanges provided with convex edges for the engagement of the lateral projections on the arms of the cam.

In testimony whereof we have hereunto set our hands in presence of two subscribing witnesses.

JOSEPH DOEPKER.
FRANK DOEPKER.

Witnesses:
J. E. SHANK,
B. A. UNVERFERTH.